(12) United States Patent
Hövel et al.

(10) Patent No.: US 8,978,249 B2
(45) Date of Patent: Mar. 17, 2015

(54) METHODS FOR REPAIRING A GAS TURBINE COMPONENT

(75) Inventors: Simone Hövel, Ennetbaden (CH); Günter Ambrosy, Baden (CH); Matthias Höbel, Windisch (CH)

(73) Assignee: Alstom Technology Ltd., Baden (CH)

( * ) Notice: Subject to any disclaimer, the term of this patent is extended or adjusted under 35 U.S.C. 154(b) by 202 days.

(21) Appl. No.: 12/915,951

(22) Filed: Oct. 29, 2010

(65) Prior Publication Data
US 2011/0099809 A1    May 5, 2011

Related U.S. Application Data

(60) Provisional application No. 61/256,386, filed on Oct. 30, 2009.

(51) Int. Cl.
*B23P 6/00* (2006.01)
*F01D 5/00* (2006.01)

(52) U.S. Cl.
CPC ............... *F01D 5/005* (2013.01); *B23P 6/005* (2013.01); *F05D 2230/80* (2013.01)
USPC ................ 29/889.1; 29/402.09; 29/402.11; 29/407.05; 29/889.7

(58) Field of Classification Search
USPC ............ 29/889.1, 889.7, 402.09, 402.08, 29/402.11, 402.13; 427/455, 554, 556; 428/173, 320.2, 596, 632, 446
See application file for complete search history.

(56) References Cited

U.S. PATENT DOCUMENTS 3,970,319 A    7/1976  Carroll et al.
4,323,756 A    4/1982  Brown et al.

(Continued)

FOREIGN PATENT DOCUMENTS

EP    1231010    8/2002
EP    1620225    2/2006

(Continued)

OTHER PUBLICATIONS

European Search Report for EP Patent App. No. 10186339.7 (Feb. 23, 2011).

(Continued)

*Primary Examiner* — Alexander P Taousakis
*Assistant Examiner* — Lee A Holly
(74) *Attorney, Agent, or Firm* — Buchanan Ingersoll & Rooney PC

(57) ABSTRACT

A method for repairing a gas turbine component includes:
  identifying on the gas turbine component (10) a worn out location, where the gas turbine component (10) is damaged;
  removing the damaged location, thereby creating a missing zone (18);
  manufacturing an insert, which fits into the missing zone (18);
  putting the insert into the missing zone (18);
  adjusting the insert in the gas turbine component (10); and
  joining the adjusted insert to the gas turbine component (10).
A higher degree of precision and automation can be achieved, because
  the worn out location is measured/scanned with a 3-D scanning/measuring system (20) to get the actual geometry of the missing zone (18), especially as a CAD data;
  the nominal geometry for the insert is defined by the actual geometry of the worn out location, with respect to certain defined gap tolerances;
  the actual geometry of the insert is measured during the manufacture of the insert;
  the nominal geometry and the actual geometry of the insert are compared; and
  an adaptive machining operation of the insert is carried out based on the results from the comparison between the actual and nominal geometries of the insert.

15 Claims, 5 Drawing Sheets

(56) References Cited

U.S. PATENT DOCUMENTS

| | | | |
|---|---|---|---|
| 4,595,637 | A | 6/1986 | Eaton et al. |
| 4,772,773 | A | 9/1988 | Hashimoto et al. |
| 4,968,383 | A | 11/1990 | Volkmann et al. |
| 5,038,014 | A | 8/1991 | Pratt et al. |
| 5,047,966 | A * | 9/1991 | Crow et al. .................. 702/168 |
| 5,121,329 | A | 6/1992 | Crump |
| 5,218,013 | A | 6/1993 | Schock |
| 5,269,057 | A * | 12/1993 | Mendham .................... 29/889.1 |
| 5,622,474 | A | 4/1997 | Werner et al. |
| 5,876,550 | A | 3/1999 | Feygin et al. |
| 5,900,170 | A | 5/1999 | Marcin, Jr. et al. |
| 5,913,555 | A * | 6/1999 | Richter et al. ............... 29/889.1 |
| 6,057,047 | A | 5/2000 | Maloney |
| 6,064,031 | A | 5/2000 | Talwar |
| 6,144,008 | A | 11/2000 | Rabinovich |
| 6,365,222 | B1 | 4/2002 | Wagner et al. |
| 6,508,000 | B2 * | 1/2003 | Burke et al. ................. 29/889.1 |
| 6,526,327 | B2 | 2/2003 | Kar et al. |
| 6,583,381 | B1 | 6/2003 | Duignan |
| 6,733,907 | B2 | 5/2004 | Morrison et al. |
| 6,838,157 | B2 * | 1/2005 | Subramanian ................ 428/173 |
| 6,912,446 | B2 * | 6/2005 | Wang et al. .................. 700/193 |
| 6,916,529 | B2 | 7/2005 | Pabla et al. |
| 7,479,328 | B2 | 1/2009 | Roth-Fagaraseanu et al. |
| 2003/0082297 | A1 | 5/2003 | Wolkers et al. |
| 2005/0164027 | A1 | 7/2005 | Lau et al. |
| 2007/0084047 | A1 * | 4/2007 | Lange et al. ................. 29/889.1 |
| 2008/0178994 | A1 * | 7/2008 | Qi et al. ........................ 156/245 |
| 2008/0182017 | A1 | 7/2008 | Singh et al. |
| 2010/0151183 | A1 | 6/2010 | Davis et al. |

FOREIGN PATENT DOCUMENTS

| | | | |
|---|---|---|---|
| EP | 1674192 | | 6/2006 |
| EP | 1887107 | | 2/2008 |
| GB | 2148755 A | * | 6/1985 ............... B23Q 3/00 |
| WO | WO 2008092461 A2 | * | 8/2008 ............. G01B 21/02 |
| WO | WO 2008155513 A1 | * | 12/2008 |

OTHER PUBLICATIONS

Non-Final Office Action from co-pending U.S. Appl. No. 12/915,920 (Mar. 28, 2013).

Non-Final Office Action from co-pending U.S. Appl. No. 12/916,032 (Dec. 13, 2012).

Office Action from co-pending U.S. Appl. No. 12/915,978 (Jul. 12, 2013).

* cited by examiner

METHODS FOR REPAIRING A GAS TURBINE COMPONENT

This application claims priority under 35 U.S.C. §119 to U.S. Provisional Application No. 61/256,386, filed 30 Oct. 2009, the entirety of which is incorporated by reference herein.

BACKGROUND

1. Field of Endeavor

The present invention relates to the technology of gas turbines, and more particularly to a method for repairing a gas turbine component.

2. Brief Description of the Related Art

Today, gas turbines have operation temperatures of more than 1000° C. Accordingly, the components of those gas turbines such as blades, vanes or liners are exposed to a high thermal load and mechanical stress. As those components are usually made of expensive high-temperature materials, it is desirable to repair those components, when damaged, instead of replacing them. However, the repair of damaged gas turbine component is difficult, when the damaged section is removed and an insert is manufactured to fit into the removed region, as the insert has to be manufactured with high precision to avoid a loss in mechanical stability and change in the flow characteristics of the machine.

The document EP 1 231 010 A1 discloses a method of repairing gas turbine engine components. The method includes removing the damaged portion and fabricating an insert to match the removed portion. The insert is precision machined and crystallographically matched to the original component, and then bonded to this component using transient liquid phase bonding techniques and suitable heat treatment. Although the document contains a wealth of information on the bonding process, no details of the precision machining of the insert are given.

The disclosure of document EP 1 620 225 B1 relates to a method for repairing and/or modifying components of a gas turbine. Initially, at least one particularly damaged section of the component, which is to be repaired, is extracted from the component. A 3-D data set is then produced for the replacement part, which is to be produced, if not available. The replacement part is subsequently produced with the aid of a rapid manufacturing process. Finally, the produced replacement part is integrated into the component, which is to be repaired. As the rapid manufacturing process is not adaptive, the precision is limited.

According to U.S. Pat. No. 5,269,057, a method for replacing airfoil components includes the steps of identifying a portion of the airfoil to be replaced, removing the portion by a nonconventional machining process, such as continuous wire electrical discharge machining, and forming a replacement member utilizing a similar cutting process. A cutting path utilized to remove the portion to be replaced and to form the replacement member includes interlocking projections and sockets and may include one or more tapers along the cutting path so that the portion may be removed only by lifting in one direction. For the cutting, an electrical discharge cutting wire moves along the outside of a CNC programmed cutting path. Again, the manufacturing process for the insert is not adaptive, which limits the precision.

SUMMARY

One of numerous aspects of the present invention includes a method for repairing a gas turbine component, which provides inserts of a very high precision, and which allows an individual and highly automated repair of the component.

Another aspect relates to the flexibility and high precision, which can be achieved by the following characteristic steps:

- the worn out location is measured/scanned by a 3-D scanning/measuring system to get the actual geometry of the missing zone, especially as CAD data;
- the nominal geometry for the insert is defined by the actual geometry of the worn out location, with respect to certain defined gap tolerances;
- the actual geometry of the insert is measured during the manufacture of the insert;
- the nominal geometry and the actual geometry of the insert are compared; and
- an adaptive machining operation of the insert is carried out based on the results from the comparison between the actual and nominal geometries of the insert.

According to an exemplary method embodying principles of the present invention, characteristic features of the damaged gas turbine component are used to establish a component-specific reference coordinate system (CCS); and the CCS is used as a reference system when comparing the nominal geometry and the actual geometry of the insert.

According to another exemplary embodiment, additional characteristic features such as reference marks are created on the damaged gas turbine component, in order to assist in the establishing of the component-specific reference coordinate system (CCS) with excellent repeatability.

According to yet another embodiment, the additional characteristic features or reference marks are created by laser engraving.

According to another embodiment, the insert is CNC machined in accordance with the comparison of the nominal geometry and the actual geometry of the insert.

According to yet another embodiment, the measuring of the actual geometry of the insert and the machining of the insert are done in the same fixture.

According to another embodiment, the measuring of the actual geometry of the insert and the machining of the insert are combined in one machine tool.

According to another embodiment, the insert is built with additional features, such as handles, pins or stems, which are not needed for its functionality in the repaired gas turbine component, but allow clamping and assist the adaptive machining operation.

According to another embodiment, the insert is manufactured with additional reference features, allowing the measurement system to determine its position and orientation relative to the CCS.

According to yet another embodiment, the insert includes additional geometrical fixation means for the joining step.

According to another embodiment, the joining is done by a low heat input generating method, which is optimized to avoid distortion during the joining.

According to another embodiment, the joining is done by brazing, laser welding, or E-beam welding, or a combination thereof.

According to another embodiment, the insert and gas turbine component are recontoured after joining.

According to yet another embodiment, the additional features are removed by a machining process after the joining operation.

BRIEF DESCRIPTION OF THE DRAWINGS

The present invention is now to be explained in more detail by reference to different embodiments and the attached drawings.

DETAILED DESCRIPTION OF EXEMPLARY EMBODIMENTS

Methods embodying principles of the present invention for repairing ex-service gas turbine components in general include removing worn out locations on a component and replacing this named location by a manufactured insert. The one-size insert can be manufactured by different manufacturing methods. Examples are the realization by casting, electron discharge machining (EDM) from spare or scrap components, milling from suitable slab material or rapid prototyping techniques such as selective laser melting. The one-size insert does normally not fit ideally in the individual different removed locations of the gas turbine component, due to service conditions, e.g. distortion of a blade tip.

For joining processes a close gap control is needed. The one-size insert is therefore designed with a small oversize, such that it can be individually fit in the removed location of the component after an additional adaptive machining operation. For this purpose each location is scanned after the removing of the worn out sections and a CAD data set with the actual geometry of the missing section is created. Out of this data the nominal geometry for the insert with defined gap tolerances is generated. The one-size insert is individually adjusted by a machining process with nominal/actual geometry comparison.

Figure 1:
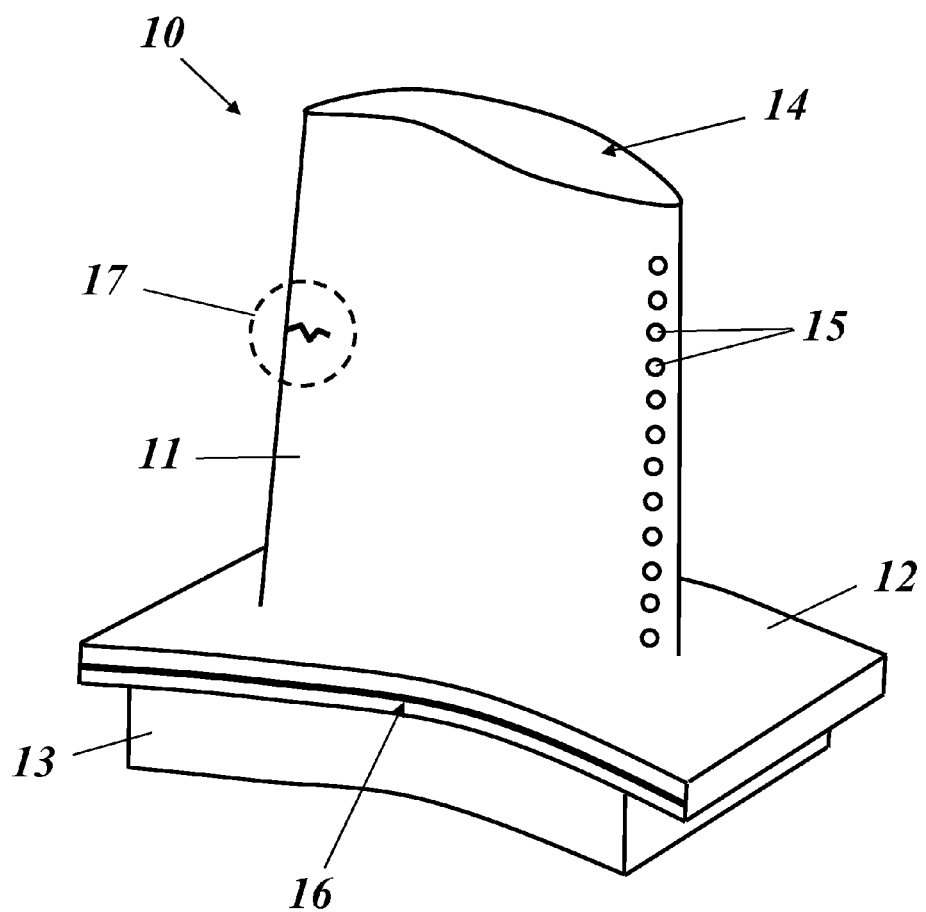
FIG. 1 shows a damaged gas turbine component in the form of a blade in a perspective side view.

FIG. 1 shows, in a perspective side view, the gas turbine component 10 in form of a turbine blade. The blade includes an aerofoil 11 with the tip 14 and a root 13 with a platform 12 in between. The blade may be provided with several cooling holes 15 for air cooling and sealing grooves 16, which may be used as characteristic features for the measuring/machining process. The gas turbine component 10 FIG. 1 has a damaged location 17 with a crack or any other damage.

According to a method embodying principles of the invention, this damaged or worn out location 17 is repaired by replacing it with a one-size insert, which is adjusted to fit in the individual machined worn out location, also in distorted components.

Figure 2:
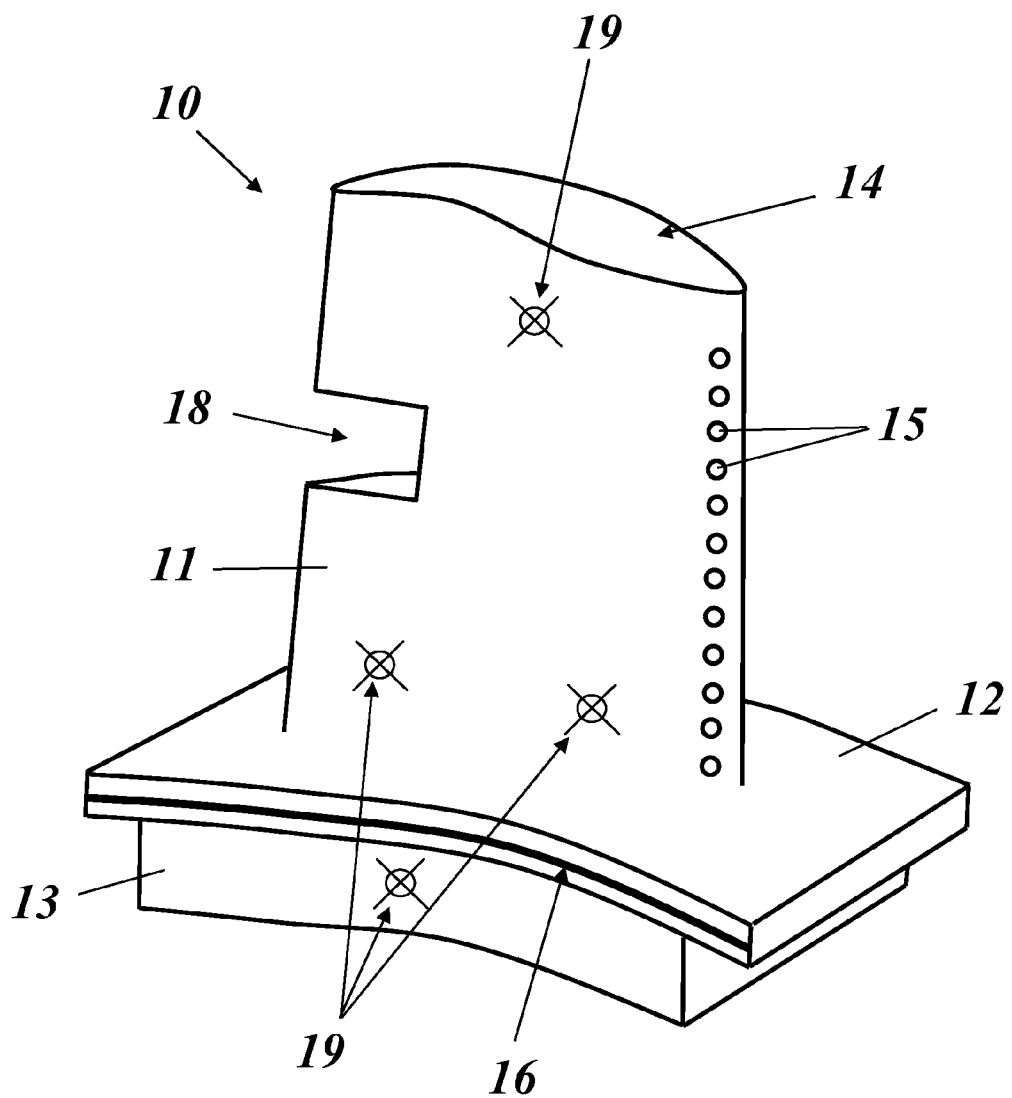
FIG. 2 shows the gas turbine component of FIG. 1 with the damaged location removed and several additional reference marks added.

First of all, the damaged location 17 on the gas turbine component 10 is machined away and has as a consequence a loss of material, i.e., the missing zone 18 (FIG. 2). This machined location can be individual, due to service condition, which causes variances. The worn out location may be with or without cooling holes 15. It may or may not have inner cavities. Furthermore, it may or may not have a special inner cooling design, e.g., turbulator ribs.

Figure 3:
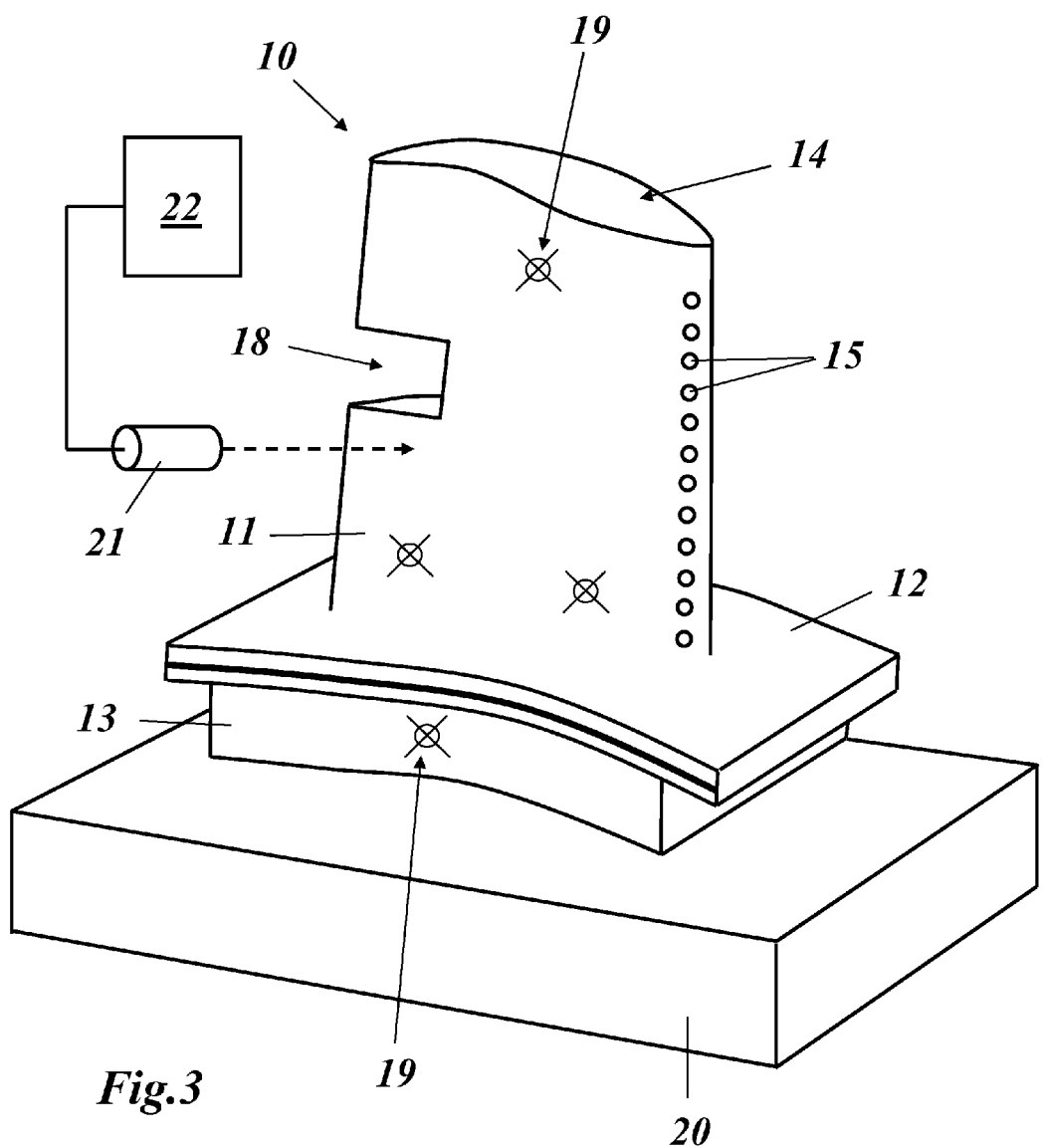
FIG. 3 shows the process of measuring/scanning the gas turbine component with the removed damaged location according to FIG. 2.

As shown in FIG. 3, the worn out location is measured/scanned by a 3-D scanning/measuring system 20 to get the actual geometry of the missing zone 18 as a CAD data set. The 3-D scanning/measuring system 20 includes a scanning/measuring device 21, which is able to scan/measure that contour of the component with tactile or optical devices. The data is processed and stored in a respective scanning/measuring control 22.

The inserts (28 in FIG. 5) are designed as one-size products with or without an oversize. They are manufactured by one of the following techniques:
- by Electric Discharge Machining (EDM) from spare or scrap components
- by milling or EDM'ing from slab material
- by casting
- by rapid prototyping methods such as Selective Laser Melting (SLM), Electronic Beam Melting (EBM), or Selective Laser Sintering (SLS).

The actual geometry of the missing zone 18 defines the nominal geometry for the insert 28 with respect to predetermined gap tolerances. To get this geometry with high precision, characteristic features such as the sealing grooves 16 or the cooling holes 15 of the damaged gas turbine component 10 are used to establish a component-specific reference coordinate system (CCS), which can be established with excellent repeatability. Furthermore, additional characteristic features such as reference marks 19 (see for example FIG. 2) may be created on the damaged gas turbine component 10, in order to assist in the establishing of this component-specific reference coordinate system CCS with excellent repeatability. As an example, those reference marks 19 can be created by laser engraving. This allows creating a CCS with high precision and repeatability. This approach is particularly useful for situations where the gas turbine component 10 does not have built-in features, which are suitable for a precise CCS determination.

When the insert 28 is machined, it is measured with optical or tactile measuring devices (see 21, 22 in FIG. 4) to create the actual geometry as a 3D CAD data set. A comparison of the nominal geometry for the one-size insert and the actual geometry of the insert is then carried out, using the CCS as a reference system.

Figure 4:
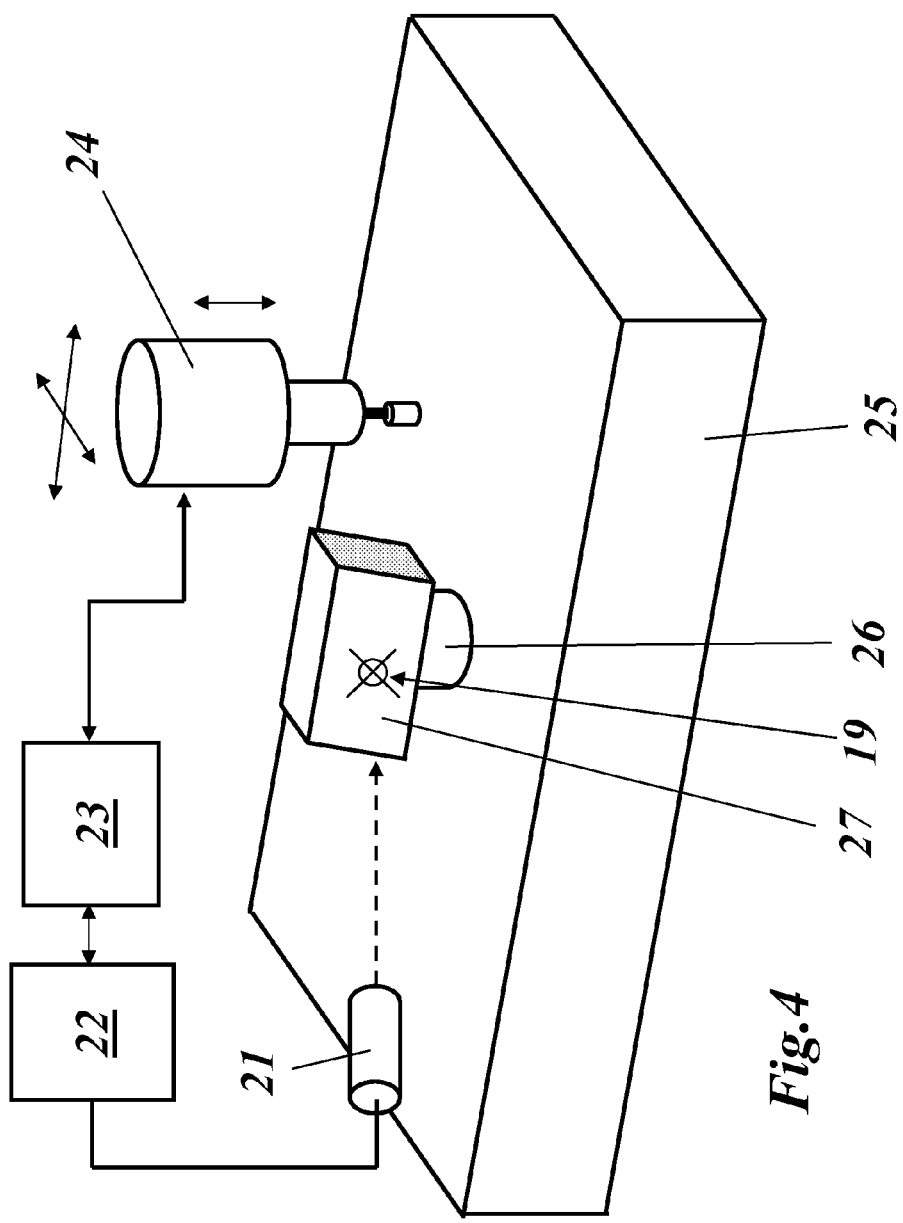
FIG. 4 shows the process of adaptive machining of the insert for the gas turbine component according to FIG. 2.

The machining of the one-size insert 28 is done as an adaptive machining operation, which is carried out based on the results from the comparison between the actual and nominal geometries of the insert 28. As an example, NC paths for a CNC machining process (e.g. grinding, milling) for the adjustment of the one-size insert 28 to the nominal geometry can be generated out of nominal/actual geometry comparison and the 3D CAD data set. FIG. 4 shows a combined measuring/machining system 25, which is used to adaptively machine an insert billet 27 to get the finished insert 28. The machining itself may be done, for example, by a machining tool 24, which is controlled by a machining control 23. The scanning/measuring control 22 and the machining control 23 preferably interact.

The generation of the NC paths is fully automated based on the comparison between the actual and nominal shapes on geometries of the insert 28. The one-size insert 28 is CNC machined according to the nominal/actual geometry comparison to fit in the individual worn out location of the gas turbine component 10. It is advantageous to do the measuring and the machining of the insert 28 in the same fixture. It also can be advantageous when the measuring and the machining process are combined in one machine tool. The adaptive machining with its comparison of the nominal and actual geometries of the insert 28 leads to the realization to a tight gap control for the joining process.

Preferably, the one-size insert 28 is built with additional features, such as handles (see 26 in FIG. 4), pins or stems, which are not needed for its functionality in the repaired gas turbine component. The built-in features are not machined, but avow clamping and assist in the adaptive machining operation. Furthermore, the one-size insert 28 may be manufactured with reference features (see reference mark 19 in AG. 4), allowing the measurement system to determine its position and orientation relative to the previously established CCS.

Figure 5:
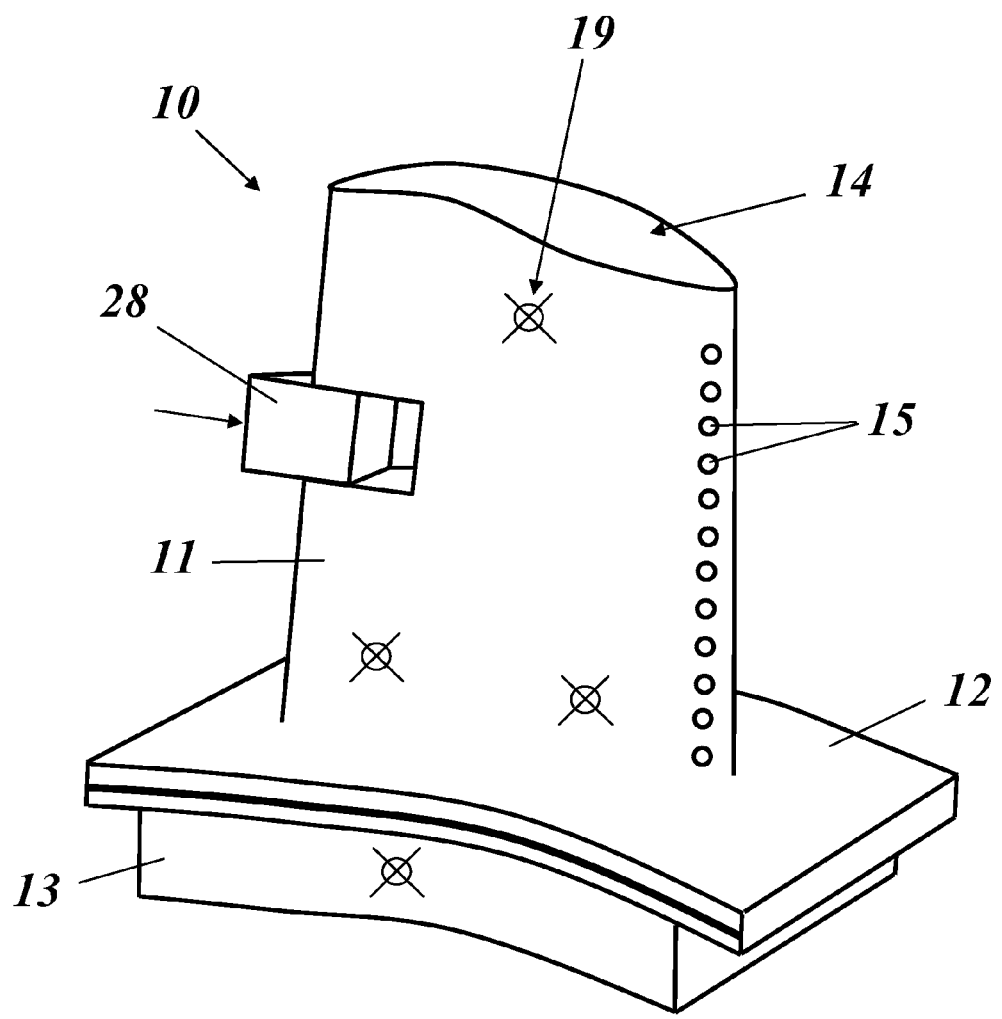
FIG. 5 shows the insertion of the machined insert into the missing zone of the gas turbine component according to FIG. 2.

Eventually, the individual adjusted insert 28 is inserted into and joined to the gas turbine component 10 (FIG. 5). The joining is preferably done by a low heat input generating method, which is optimized to avoid distortion during the joining. Examples of such a low heat input generating method are: brazing, laser welding (with or without using filler wire) or E-beam welding, or a combination thereof.

In addition, the replacing insert may or may not have a geometrical fixation device for the joining step, as is disclosed in U.S. Pat. No. 5,269,057. When the insert 28 and the gas turbine component 10 are joined, the component may be recontoured. In the same way, additional handles 26 may be removed by a machining process after the joining operation.

Exemplary methods embodying principles of the present invention can have the following advantages over existing technologies:

Individual damaged sections on gas turbine components can be variable. A one-size cast insert does not fit in the individual worn out locations, so that the requirements for tight gap control of the joining process can be met. According to principles of the invention, the insert will individually be adjusted;

the additional reference marks on the component and the pre-manufactured inserts assist for the comparison of actual and nominal shapes and for the optimal fit between insert and component;

with the additional reference marks, a higher degree of automation is possible for the adaptive machining and joining operations;

the additional handles/stems of the insert make the adaptive machining and joining easier. A higher degree of automated operations seems achievable which will make the method more economic;

reproducibility and process stabilization are enhanced; and an increased number of components can be reconditioned, so that the scrap rate is reduced.

LIST OF REFERENCE NUMERALS

10 gas turbine component (e.g. blade)
11 aerofoil
12 platform
13 root
14 tip
15 characteristic feature (e.g. cooling hole)
16 characteristic feature (e.g. sealing groove)
17 damaged location
18 missing zone
19 additional characteristic feature (e.g. reference mark)
3-D scanning/measuring system
21 scanning/measuring device
22 scanning/measuring control
23 machining control
24 machining tool
25 combined measuring/machining system
26 handle
27 insert billet
28 one-size insert (machined)

While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

We claim:

1. A method for repairing a gas turbine component comprising:
    identifying on said gas turbine component a worn out location at which said gas turbine component is damaged;
    removing said damaged location and creating a missing zone;
    manufacturing an insert which fits into said missing zone, wherein the insert is pre-cast with built-in features;
    putting said insert into said missing zone;
    adjusting said insert in said gas turbine component;
    joining said adjusted insert to said gas turbine component;
    measuring the worn out location with a 3-D measuring system to determine the actual geometry of the missing zone;
    wherein a nominal geometry for the insert is defined by said actual geometry of the missing zone by establishing a component-specific reference coordinate system using characteristic features of the damaged gas turbine component including predefined gap tolerances and user-defined reference marks;
    wherein measuring the actual geometry of the insert comprises measuring during said manufacturing an insert;
    comparing the nominal geometry and the actual geometry of the insert based on the component-specific reference coordinate system;
    wherein manufacturing an insert comprises adaptive machining the insert based on said comparing;
    wherein the built-in features of the insert are not needed for functionality of the insert in the repaired gas turbine component, the built-in features being configured and arranged to allow clamping during at least one of the putting, adjusting, and forming steps, and assisting during the adaptive machining operation; and
    removing said built-in features not needed for functionality of the insert by machining after said joining.

2. The method according to claim 1, wherein creating reference marks comprises laser engraving.

3. The method according to claim 1, wherein manufacturing an insert comprises CNC machining based on said comparing of the nominal geometry and the actual geometry of the insert.

4. The method according to claim 1, wherein said measuring of the actual geometry of the insert and said adaptive machining of the insert are performed in the same fixture.

5. The method according to claim 1, wherein said measuring of the actual geometry of the insert and said adaptive machining of the insert are performed in one machine tool.

6. The method according to claim 1, wherein said built-in features comprise handles, pins, or stems.

7. The method according to claim 1, wherein manufacturing the insert comprises forming reference features configured and arranged to allow the measurement system to determine the position and orientation of the insert relative to the component-specific reference coordinate system.

8. The method according to claim 1, wherein the insert comprises additional geometrical fixation devices for said joining.

9. The method according to claim 1, wherein said joining comprises low heat input joining optimized to avoid distortion of the insert.

10. The method according to claim 9, wherein joining comprises brazing, laser welding, E-beam welding, or combinations thereof.

11. The method according to claim 1, further comprising: recontouring the insert and gas turbine component after said joining.

12. The method according to claim 1, wherein determining the actual geometry of the missing zone comprises generating CAD data.

13. The method according to claim 1, comprising: engraving user-defined reference marks on a surface of the gas turbine component.

14. A method for repairing a gas turbine component comprising:
identifying on said gas turbine component a worn out location at which said gas turbine component is damaged;
removing said damaged location and creating a missing zone;
measuring the worn out location with a 3-D measuring system to determine an actual geometry of the missing zone, wherein a nominal geometry for the insert is defined by said actual geometry of the missing zone by establishing a component-specific reference coordinate system using characteristic features of the damaged gas turbine component including predefined gap tolerances and user-defined reference marks;
manufacturing an insert which fits into said missing zone, wherein said insert is pre-cast with built-in features, said manufacturing including measuring an actual geometry of the insert and comparing the nominal geometry and the actual geometry of the insert based on the component-specific reference coordinate system;
putting said insert into said missing zone;
adjusting said insert in said gas turbine component; and
joining said adjusted insert to said gas turbine component;
wherein the built-in features of the insert are not needed for functionality on a surface of the insert, the built-in features being configured and arranged to extend from a surface of the insert and allow clamping during at least one of the putting, adjusting, and forming steps, and assisting during the adaptive machining operation.

15. The method of claim 14, comprising:
removing said built-in features not needed for functionality of the insert by machining after said joining.

* * * * *